United States Patent
Bywaters et al.

(10) Patent No.: US 8,816,520 B2
(45) Date of Patent: Aug. 26, 2014

(54) SYSTEMS FOR LOAD REDUCTION IN A TOWER OF AN IDLED WIND-POWER UNIT AND METHODS THEREOF

(75) Inventors: Garrett L. Bywaters, Waitsfeild, VT (US); Austin Cate, Montpelier, VT (US); Jeffrey K. Petter, Williston, VT (US)

(73) Assignee: Northern Power Systems, Inc., Barre, VT (US)

( * ) Notice: Subject to any disclaimer, the term of this patent is extended or adjusted under 35 U.S.C. 154(b) by 308 days.

(21) Appl. No.: 13/315,907

(22) Filed: Dec. 9, 2011

(65) Prior Publication Data
US 2012/0146333 A1 Jun. 14, 2012

Related U.S. Application Data

(60) Provisional application No. 61/421,479, filed on Dec. 9, 2010.

(51) Int. Cl.
*H02P 9/04* (2006.01)
*F03D 7/02* (2006.01)

(52) U.S. Cl.
CPC ....... *F03D 7/0296* (2013.01); *F05B 2270/1095* (2013.01); *F03D 7/0248* (2013.01); *F05B 2270/332* (2013.01); *Y02E 10/723* (2013.01); *F05B 2260/90* (2013.01)
USPC ........................................................ 290/44

(58) Field of Classification Search
USPC ........................................................ 290/44
See application file for complete search history.

(56) References Cited

U.S. PATENT DOCUMENTS

| | | | |
|---|---|---|---|
| 5,289,041 A | 2/1994 | Holley | |
| 6,441,507 B1 * | 8/2002 | Deering et al. | 290/44 |
| 6,888,262 B2 | 5/2005 | Blakemore | |
| 7,004,724 B2 | 2/2006 | Pierce et al. | |
| 7,075,192 B2 | 7/2006 | Bywaters et al. | |
| 7,175,389 B2 | 2/2007 | Moroz et al. | |
| 7,244,100 B2 | 7/2007 | Yoshida | |
| 7,309,930 B2 | 12/2007 | Suryanarayanan et al. | |
| 7,352,075 B2 | 4/2008 | Willey et al. | |
| 7,418,820 B2 * | 9/2008 | Harvey et al. | 60/487 |

(Continued)

FOREIGN PATENT DOCUMENTS

| | | |
|---|---|---|
| EP | 0020207 A1 | 12/1980 |
| EP | 2133563 A1 | 12/2008 |

(Continued)

OTHER PUBLICATIONS

J.M. Jonkman, Dynamics Modeling and Loads Analysis of an Offshore Floating Wind Turbine, National Renewable Energy Laboratory, Technical Report; NREL/TP-500-41958; Nov. 2007; Table of Contents and Chapter 6, pp. 102-122.

(Continued)

*Primary Examiner* — Michael Zarroli
(74) *Attorney, Agent, or Firm* — Downs Rachlin Martin PLLC

(57) ABSTRACT

Systems and methods for reducing dynamic loading in an idled wind power unit include sensing at least one parameter indicative of dynamic loading and executing a reduced torque brake mode, which may comprise a controlled brake and brake-release sequence, with the turbine braking system when the sensed parameter exceeds a selected value. The reduced torque brake mode absorbs energy and reduces dynamic loading thereby.

30 Claims, 7 Drawing Sheets

(56) References Cited

U.S. PATENT DOCUMENTS

| | | |
|---|---|---|
| 7,431,567 B1 | 10/2008 | Bevington et al. |
| 7,488,155 B2 | 2/2009 | Barbu et al. |
| 7,602,075 B2 | 10/2009 | Erdman et al. |
| 7,617,741 B1 | 11/2009 | Lowe-Wylde |
| 7,763,989 B2 | 7/2010 | Kinzie et al. |
| 7,939,961 B1 | 5/2011 | Bonnet |
| 8,076,789 B2 | 12/2011 | Miller |
| 8,080,891 B2 * | 12/2011 | Schramm et al. ............... 290/44 |
| 8,093,738 B2 | 1/2012 | Stiesdal |
| 8,109,722 B2 | 2/2012 | Gamble et al. |
| 8,178,986 B2 | 5/2012 | Vyas et al. |
| 8,183,707 B2 | 5/2012 | Siebers et al. |
| 8,212,373 B2 | 7/2012 | Wittekind et al. |
| 8,410,625 B2 | 4/2013 | Stiesdal |
| 8,649,911 B2 | 2/2014 | Avagliano et al. |
| 2005/0169755 A1 | 8/2005 | Yoshida |
| 2006/0153672 A1 | 7/2006 | Davis |
| 2007/0166147 A1 | 7/2007 | Merswolke et al. |
| 2007/0170724 A1 | 7/2007 | Calley |
| 2007/0187954 A1 | 8/2007 | Struve et al. |
| 2009/0039651 A1 | 2/2009 | Stiesdal |
| 2009/0317250 A1 | 12/2009 | Gamble et al. |
| 2010/0194114 A1 | 8/2010 | Pechlivanoglou et al. |
| 2010/0215502 A1 * | 8/2010 | Harrison ....................... 416/205 |
| 2010/0329842 A1 | 12/2010 | Stiesdal |
| 2011/0178771 A1 | 7/2011 | Miranda |
| 2011/0187108 A1 * | 8/2011 | Wakasa ........................... 290/44 |
| 2011/0299975 A1 * | 12/2011 | Pechlivanoglou ............ 415/123 |
| 2012/0025528 A1 | 2/2012 | Sipil et al. |
| 2012/0049520 A1 | 3/2012 | Stiesdal |
| 2012/0074712 A1 * | 3/2012 | Bursal ............................. 290/55 |
| 2012/0139248 A1 | 6/2012 | Bertolotti |
| 2012/0263601 A1 | 10/2012 | Baker et al. |
| 2013/0099497 A1 | 4/2013 | Bowyer et al. |
| 2013/0272877 A1 | 10/2013 | Andersen et al. |
| 2014/0003939 A1 | 1/2014 | Adams et al. |
| 2014/0037448 A1 | 2/2014 | Fu et al. |

FOREIGN PATENT DOCUMENTS

| | | |
|---|---|---|
| EP | 2306005 A2 | 4/2011 |
| WO | 2007043895 | 4/2007 |
| WO | 2008049426 A1 | 5/2008 |
| WO | 2009068035 A2 | 6/2009 |
| WO | 2010084131 A2 | 7/2010 |
| WO | 2011157342 A2 | 12/2011 |

OTHER PUBLICATIONS

"Spinner Anemometry—an Innovative Wind Measurement Concept," by T.F. Pedersen et al.,www.metek.de/.../usonic-1-spinner.html?...Spinner%20Anemometry . . . ; pp. 1-8; 2009.

U.S. Appl. No. 13/746,123, filed Jan. 21, 2013.

PCT International Search Report dated Apr. 24, 2012 for related PCT/US2011/064231 entitled "Systems for Load Reduction in a Tower of an Idled Wind-Power Unit and Methods Thereof," Garrett Bywaters, et al.

Office Action (Non-Final) dated Apr. 18, 2014 related to U.S. Appl. No. 13/746,123, filed Jan. 21, 2013, Lynch.

Spinner Anemometry—An Innovative Wind Measurement Concept; TF Pedersen*), N Sørensen, HA Madsen, R Møller, M Courtney, Risø National Laboratory, 8 pages, 2009.

* cited by examiner

SYSTEMS FOR LOAD REDUCTION IN A TOWER OF AN IDLED WIND-POWER UNIT AND METHODS THEREOF

RELATED APPLICATION DATA

This application claims the benefit of priority of U.S. Provisional Patent Application Ser. No. 61/421,479, filed Dec. 9, 2010, and titled "Method and System for Load Reduction in a Tower of an Idled Wind-Power Unit," which is incorporated by reference herein in its entirety.

TECHNICAL FIELD

The present disclosure generally relates to the field of wind-power units. In particular, the present disclosure is directed to systems for load reduction in a tower of an idled wind-power unit and methods thereof.

BACKGROUND

Wind-power units ("WPU"s), which generate electrical power from the energy in wind, continue to increase in importance as alternative, or "renewable," energy sources. In some weather or turbine conditions the WPU must be "idled", and in some cases fully parked, to limit the loads imposed on the WPU and ensure personnel and equipment safety at all times. For a typical horizontal axis WPU, idling usually entails pitching the blades roughly 90 degrees to a shutdown position, permitting the rotor of the WPU to rotate slowly. In some other examples, a WPU's control logic may call for an additional brake to be applied and for the WPU to be "parked", with the brake bringing the rotor to a complete stop and essentially locking the rotor from rotating. The WPU may also include a yaw drive that permits an idled or parked rotor to be turned into the wind. Each of these actions, either separately or together, typically reduces the forces the wind exerts on the WPU, thereby reducing the risk of damage to the WPU. However in some cases while the WPU is in an idled or a parked state, off-axis winds interacting with the rotor can result in unsteady and oscillating loads applied to the rotor blades. These oscillating loads can result in dynamic loading of the WPU structure and in the supporting tower that can exceed normal loading conditions and cause equipment damage.

SUMMARY OF THE DISCLOSURE

The present disclosure describes exemplary embodiments of methods and apparatus for sensing and responding to dynamic loading conditions that might result in damage to reduce overall loads imposed on the WPU, as well as the WPU's supporting tower and foundation system.

In one implementation, the present disclosure is directed to a system for reducing dynamic loading in a wind power unit in a parked or idled condition, the wind power unit including a turbine, a turbine axle having a longitudinal axis, and a wind power unit brake system including at least one turbine brake. The system includes a sensor adapted to be positioned with the wind power unit and configured to sense at least one parameter indicative of dynamic loading in the wind power unit and produce a dynamic loading signal representative thereof; and a logic circuit in communication with the sensor to receive the dynamic loading signal, the logic circuit being configured to generate a braking signal in response to the dynamic loading signal indicating a level of dynamic loading exceeding a selected value; wherein the brake system is configured to receive the braking signal and execute a reduced torque brake mode in response to the braking signal to reduce the dynamic loading of the wind power unit by permitting intermittent slip of the brake system.

In another implementation, the present disclosure is directed to a method of reducing dynamic loading in an idled wind power unit, the wind power unit including a turbine on a turbine axle and a brake system. The method includes sensing a parameter indicative of dynamic loading of the wind power unit; determining if the sensed parameter is at least at a selected value; and instructing the brake system, when the sensed parameter is at least at the selected value, to execute a reduced torque brake mode to reduce the dynamic loading of the tower.

In still another implementation, the present disclosure is directed to a system for reducing dynamic loading in a tower of a wind power unit. The system includes a sensor configured to detect dynamic loading in the wind power unit and generate a signal indicating the detected loading; and a logic circuit configured to receive the signal and to send a second signal to a turbine brake system in the wind power unit wherein the second signal causes the brake system to execute a reduced torque brake mode to reduce the dynamic loading of the tower.

In yet another implementation, the present disclosure is directed to a system for reducing dynamic loading in a wind power unit in a parked or idled condition, the wind power unit including a turbine, a turbine axle having a longitudinal axis, and a wind power unit brake system including at least one turbine brake. The system includes a sensor adapted to be positioned with the wind power unit and configured to sense at least one parameter indicative of dynamic loading in the wind power unit and produce a signal representative thereof; means, communicating with the sensor to receive the dynamic loading signal, for generating a braking signal in response to the level of dynamic loading exceeding a selected valve and outputting the braking signal to the braking system, wherein the braking signal includes instructions for execution of a reduced torque brake mode to reduce the dynamic loading of the wind power unit by permitting intermittent slip of the parked turbine.

In still yet another implementation, the present disclosure is directed to a system for reducing dynamic loading in a wind power unit in a parked or idled condition, the wind power unit including a turbine, and a turbine axle having a longitudinal axis. The system includes a sensor adapted to be positioned with the wind power unit and configured to sense at least one parameter indicative of dynamic loading in the wind power unit and produce a signal representative thereof, the dynamic loading including at least a component of motion perpendicular to the longitudinal axis of the turbine axle; a processor in communication with the sensor to receive the representative signal, the processor being configured and programmed to determine a level of dynamic loading indicated by the sensed parameter and compare the level to at least one selected value, the processor being further programmed to generate a braking instruction in response to the level of dynamic loading exceeding a selected valve; and a wind power unit brake system including at least one turbine brake, the system configured to receive the braking instruction from the processor, wherein the braking instruction includes a controlled braking and brake-release command for the brake, the controlled braking and brake-release command causing execution by the brake system of a reduced torque brake mode to reduce the dynamic loading of the wind power unit by permitting intermittent slip of the parked turbine.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Disclosed herein are systems and methods for using controlled rotor braking of an idling or a parked WPU so as to reduce dynamic loading that can occur in a WPU tower and foundation under certain environmental conditions. Exemplary manifestations of dynamic loading include, but are not limited to, oscillation, elastic or plastic strain, a bending moment, or other physical or electrical response exhibited by a WPU tower or component that indicate a dynamic load is being experienced by the WPU. The disclosed systems and methods include sensing one or more indicia of dynamic loading within the WPU, determining if the dynamic loading warrants intervention, and then reducing the dynamic loading by modulating excitation factors. As will be appreciated by persons of ordinary skill in the art, systems in accordance with embodiments of the invention may be designed with the control logic executed in digital or analog logic circuits. In one exemplary embodiment, excitation factors may be modulated while the WPU is in a braked and parked state by performing a controlled partial release of the brake to produce a reduced torque brake mode. In such an embodiment, the braking control absorbs energy by allowing a limited, intermittent rotor slip, thereby damping the excitation factors and reducing dynamic loading.

Figure 1:
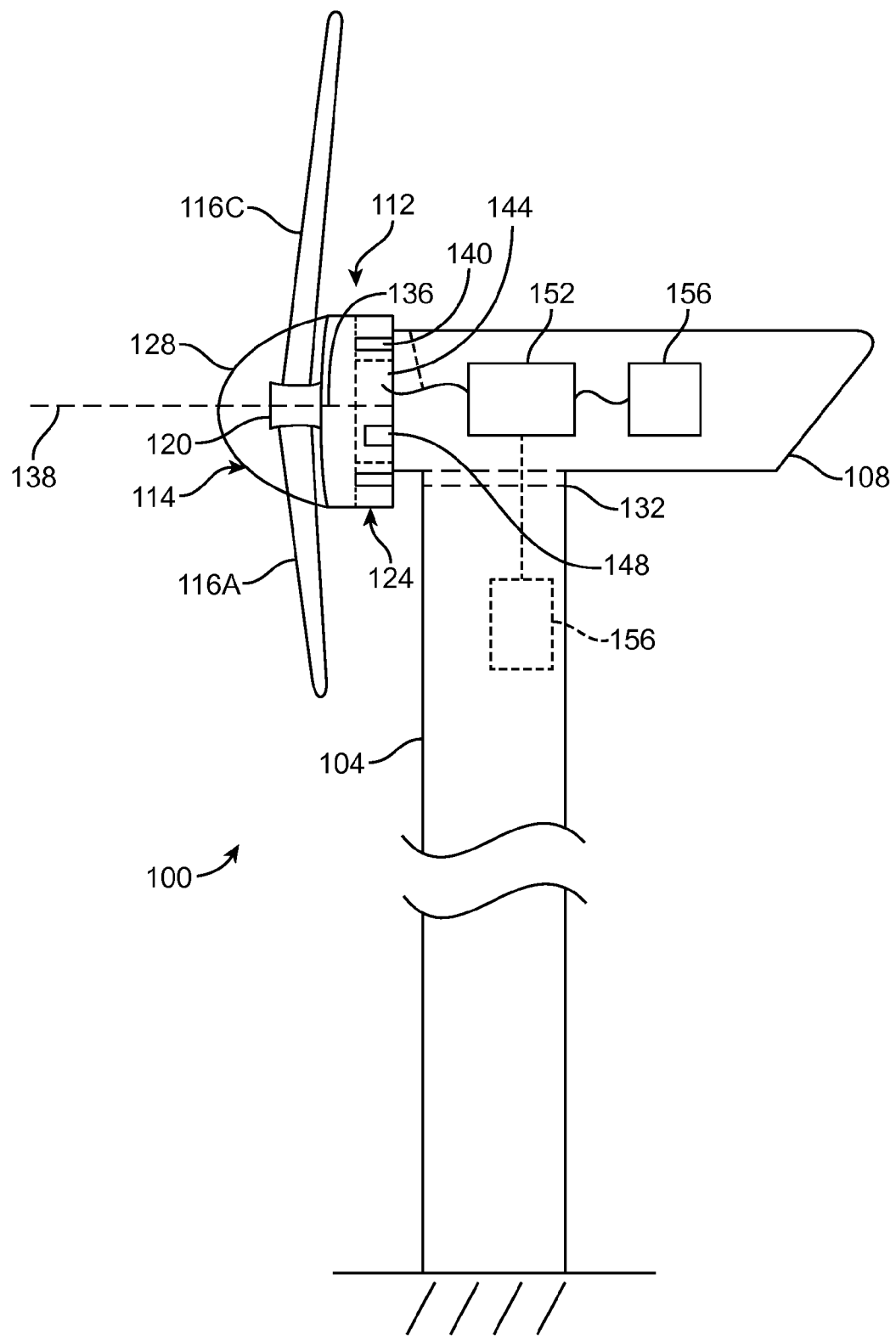
FIG. 1 is an elevational schematic view of a wind-power unit (WPU)

Referring now to the drawings, FIG. 1 illustrates one exemplary embodiment of a WPU 100, which includes a tower 104, a nacelle 108 disposed on top of the tower, and a turbine 112 that is proximate to the nacelle. In this embodiment, hub assembly 114 comprises an assembly of blades 116A-C, hub 120, and nose cone 128. Electrical power generator 124 includes rotor shaft 136, stator 140, and rotor 144. Turbine 112 is an assembly of hub assembly 114 and electrical power generator 124. In this example, the rotation of turbine 112 turns rotor shaft 136, which in turn rotates rotor 140 with respect to stator 144, thereby generating electricity. A yaw-drive 132 is disposed on top of tower 104 and within nacelle 108. The general arrangement of the main components may be consistent with known WPUs and describes a gearless, direct drive configuration. The invention could be applied equally to a wind turbine configuration that uses a single or multiple stage gearbox to interface the hub assembly with the electrical power generator.

WPU 100 also includes a brake system 148, a processor 152 and a sensor 156. Braking system 148 may comprise any appropriate WPU braking system as may be selected by a person of ordinary skill in the art for use with embodiments of the invention as taught herein. Such systems generally include a brake acting on a braking surface, which may be, for example, on the rotor, shaft, a break drum or disk attached to the rotor or shaft, or other appropriate structure. Processor 152, which may comprise a programmable logic controller, may be generally conventional, with the processor additionally configured for control according to embodiments as described herein. Sensor 156 is attached to WPU 100 at a location facilitating the detection of stress, strain, movement, acceleration or other indicia of dynamic loading of WPU 100 in accordance with the particular embodiments as will be appreciated by persons of ordinary skill in the art based on the teachings herein. The location of sensor 156, shown alternatively in dashed lines on tower 104, as well as the type of the sensor, depends on the indicia of dynamic loading to be detected. In one example, if the skilled artisan chooses to detect oscillation in WPU 100 by measuring the elastic strain experienced by tower 104, then sensor 152 may be a strain gauge attached to the tower. The specific location of sensor 156 on tower 104, and even the type of sensor used, are a function of the sensitivity of the sensor, the physical (or electrical) response to be detected, the location that the physical (or electrical) response is expected to occur on the tower or WPU 100, convenience of attachment, and other factors known to those skilled in the art. The use of brake system 148, processor 152, and sensor 156 in the context of the present disclosure will be described in more detail below.

Figure 2:
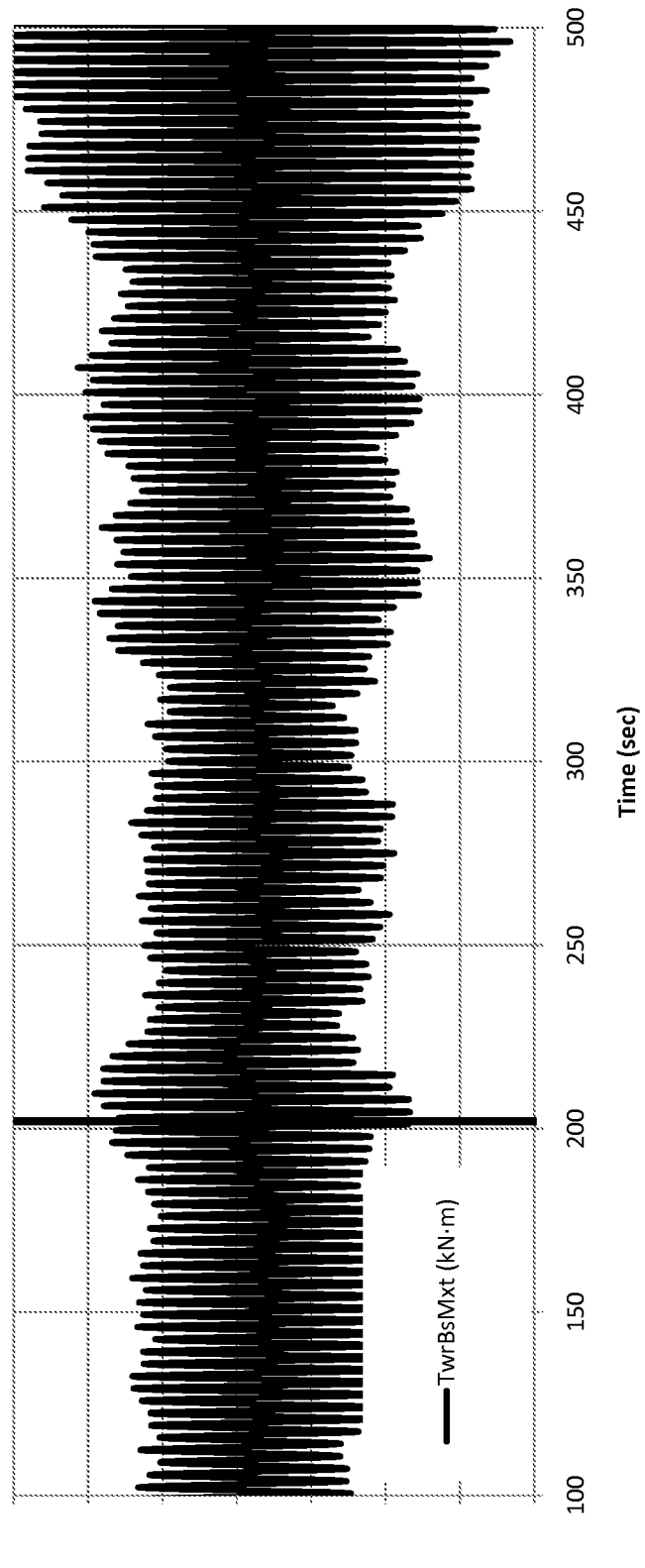
FIG. 2 is a plot of simulated bending moments in a tower of a WPU as a function of time operating without the benefit of the present invention, wherein the WPU includes a turbine with blades oriented approximately as illustrated in FIG. 3.
Figure 3:
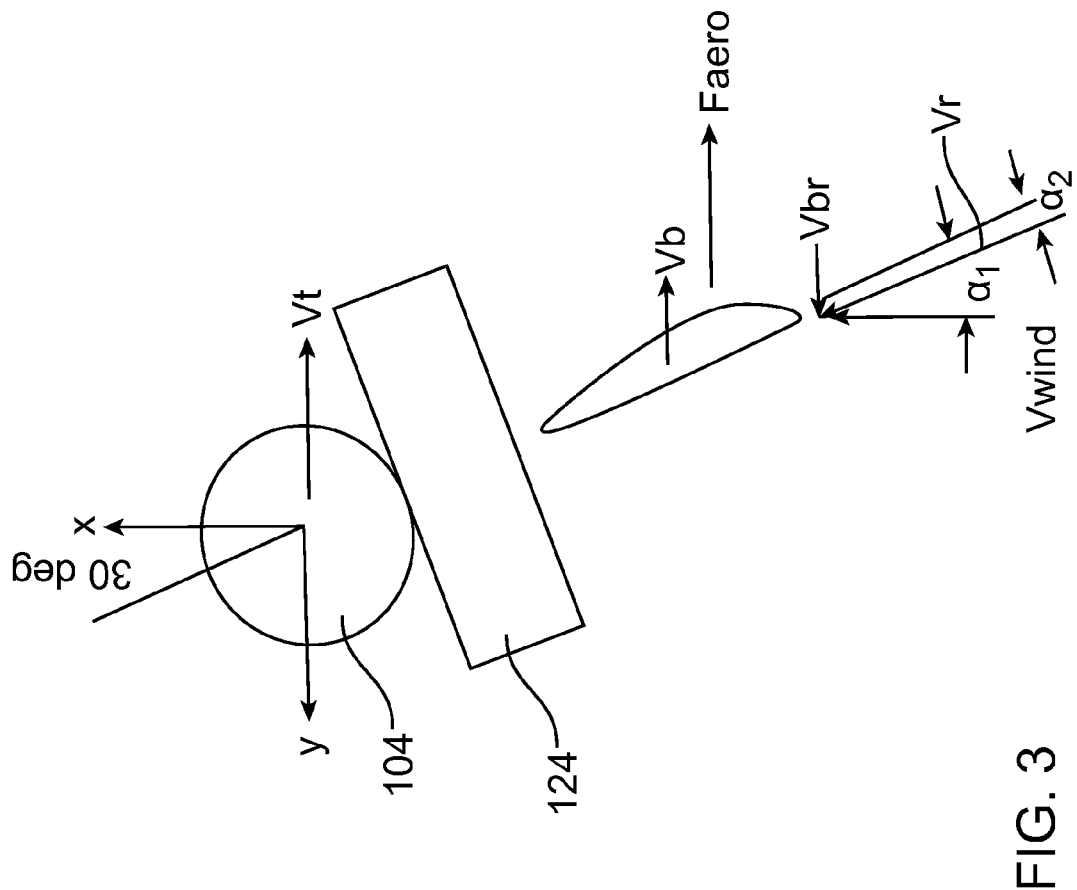
FIG. 3 is a free body diagram of exemplary wind conditions described herein that can accentuate oscillations of a tower of a WPU.

In one example, when WPU 100 is idled, damaging oscillations can occur when, for example, the rotor shaft 136 of turbine 112 is angled between 20° and 40° with respect to the wind. FIG. 3 is a free body diagram that illustrates the forces in this situation. Wind vector $V_{wind}$ and rotor shaft 136 are separated by a 30° angle resulting in a bending moment being generated. FIG. 2 illustrates an example of the bending moments experienced by tower 104 when WPU 100 is in the situation depicted in FIG. 3. As shown in FIG. 2, the side-side tower bending moment in this case can begin to oscillate between positive and negative moment values with increasing magnitude over time. In other words, WPU 100 can start to oscillate from one side to the other, in a direction approximately perpendicular to a longitudinal axis 138 of rotor shaft 136. The values depicted in FIG. 2 can be several multiples of the maximum load levels that tower 104 is otherwise designed to withstand.

As further shown in FIG. 3, in addition to the force of the wind acting on WPU 100 as a whole, another source of energy that can contribute to dynamic loading in WPU 100 is the aerodynamic force induced in blades 116A-C. Blades 116A-C have an airfoil shape used to improve the conversion of the energy in wind into electricity. Even when turbine 112 and blades 116A-C are not rotating, the blades can still be a source of force when the wind is moving relative to the blades.

This relative movement may cause an aerodynamic force to be exerted on blades 116A-C, which may then be transferred to tower 104.

As also illustrated by FIG. 3, blades having an adjustable angle of attack can further contribute to conditions leading to damaging dynamic loading of WPU 100. This contribution occurs because the blade orientation can be adjusted to a position that optimizes aerodynamic forces. For example, as shown in FIG. 3, oscillations can be increased when at least one blade of blades 116A-C is pitched to about 90 degrees. Pitching a blade, in this example blade 116A, at an angle can increase oscillations because the aerodynamic force exerted by the wind on blade 116A, $F_{aero}$, is in the same direction as tower 104 movement, $V_t$. These loads, which cause blade and tower deflections that can couple with loads and become unsteady and dynamic in nature, can create an oscillating load condition.

Figure 4:
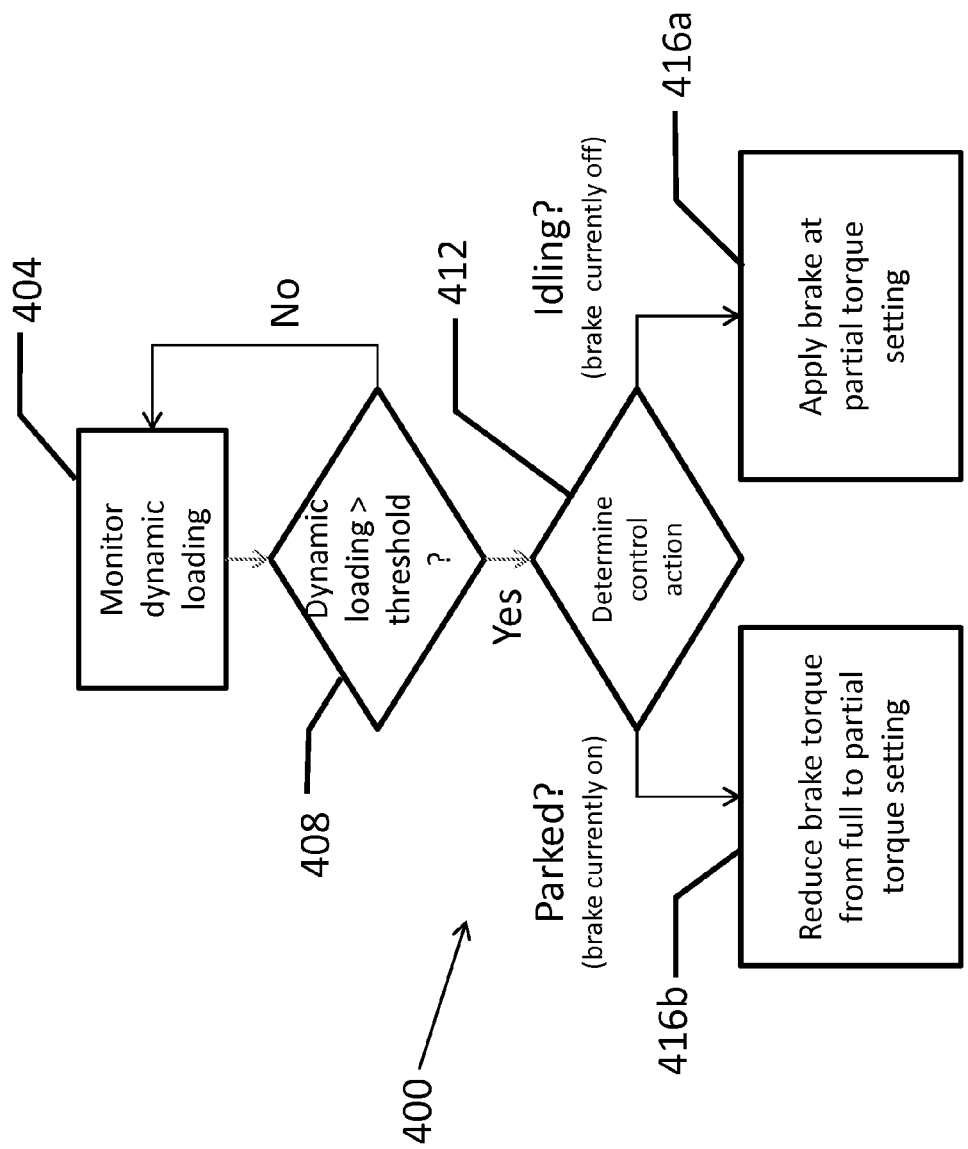
FIG. 4 is a flow diagram illustrating an exemplary method of detecting and reducing oscillations in a WPU tower in accordance with the present disclosure.

Turning now to FIG. 4, with continuing reference to FIG. 1, an exemplary method 400 for reducing dynamic loading, as indicated in this example by oscillation in tower 104, is described. At step 404, oscillations in tower 104 are monitored and detected using sensor 156. As explained above, in one example, sensor 156 may be a strain gauge that detects physical distortions in tower 104. In another example, sensor 156 may be a motion or displacement sensor used to measure the movement of tower 104 or nacelle 108. The location of sensor 156 may be a function of, for example, the sensitivity of the sensor, the type of motion or force that the sensor can detect, and the expected location of the motion or force in WPU 100, as well as other factors that may be determined by persons skilled in the art based on the particular tower—WPU configuration. In yet another example, sensor 156 may be an accelerometer if the motion to be detected is the acceleration of an oscillating WPU. Sensor 156 may measure either the acceleration in velocity or direction, or both, or a combination of the two. Other types of sensors used to detect movement are well known in the art.

At step 408, motion, force or other parameter detected by sensor 156 as indicative of oscillations are communicated to processor 152. Processor 152 determines whether the indicated oscillations are of sufficient frequency, velocity, amplitude, force, or magnitude to intervene. Part of this determination requires knowledge of the types and degrees of oscillation that are acceptable. For example, WPUs are generally expected to oscillate to some degree and tower 104 is expected to be elastically strained to some degree. This expectation arises because of the natural elasticity in tower 104 construction materials and design, combined with the fact that WPUs are routinely exposed to high winds. Based on the teachings contained herein, persons of ordinary skill in the art will be able to determine appropriate oscillation magnitude for intervention depending on the specific WPU design.

At step 412, once processor 152 determines at step 408 that the oscillations merit intervention, the processor then determines the type of control signal to send to braking system 148 based on the state of WPU 100. If WPU 100 is in an idling condition with the blades pitched to a feathered angle and hub assembly 114 free to slowly rotate, a controlled, partial brake application can be initiated at step 416a. Several methods of controlled braking are feasible to provide the reduced torque brake mode. One example of controlled braking is to apply partial brake pressure, or clamping force, with braking system 148, thereby applying a reduced braking torque to the rotating components. This reduced brake torque state will continue to restrict the movement of turbine 112, while still allowing it to slip periodically depending on wind conditions. Such an operational mode dampens the oscillations by absorbing some of the energy of the oscillations. In another example of controlled braking, a position of a brake-pad (not shown) of braking system 148 is adjusted to decrease the braking force exerted on the turbine as compared to the full force setting of the system. In a further alternative, the brake may be sequentially applied and released in a controlled manner.

However, if WPU 100 is instead in a braked condition as determined at step 412, with the turbine completely locked by full application of braking system 148, then a controlled, partial brake release can be initiated at step 416b by reducing the brake pressure, or clamping force, thereby applying a reduced braking applied torque to the turbine. As in the prior example, the reduced torque brake mode will continue to restrict the movement of turbine 112 while still allowing it to slip periodically depending on wind conditions, again dampening the oscillations by absorbing some of the energy of the oscillations. Any of the reduced torque brake modes mentioned above may be applied.

Figure 5:
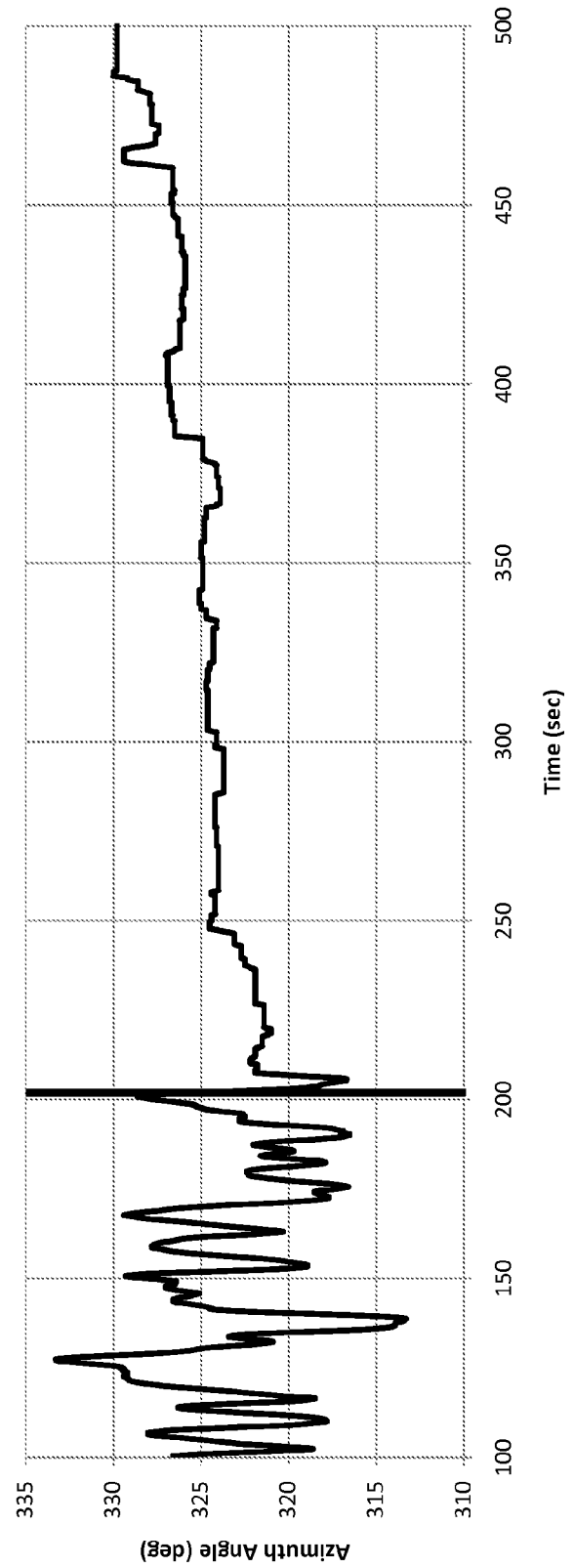
FIG. 5 is a plot of simulated rotor azimuth angle as a function of time in a WPU operating in accordance with an exemplary embodiment of the present disclosure.

FIG. 5 provides results of an exemplary simulation illustrating movement of turbine 112 subjected to controlled braking as described above. The movement of turbine 112, which is represented by the rotor azimuth angle in FIG. 5, may be characterized as "stick-slip." The Y-axis of FIG. 5 shows the rotational position of a reference blade in degrees, with the "12 o'clock" position being equal to 360°. The X-axis of FIG. 5 shows the time of the simulation in seconds, with application of braking reduced torque brake mode in accordance with embodiments of the invention applied at time=200 seconds. As illustrated by the many plateaus in the graph, controlled braking causes the turbine, as indicated by the position of the reference blade, to "stick" in a position for a brief period of time before "slipping" into a new position.

Figure 6:
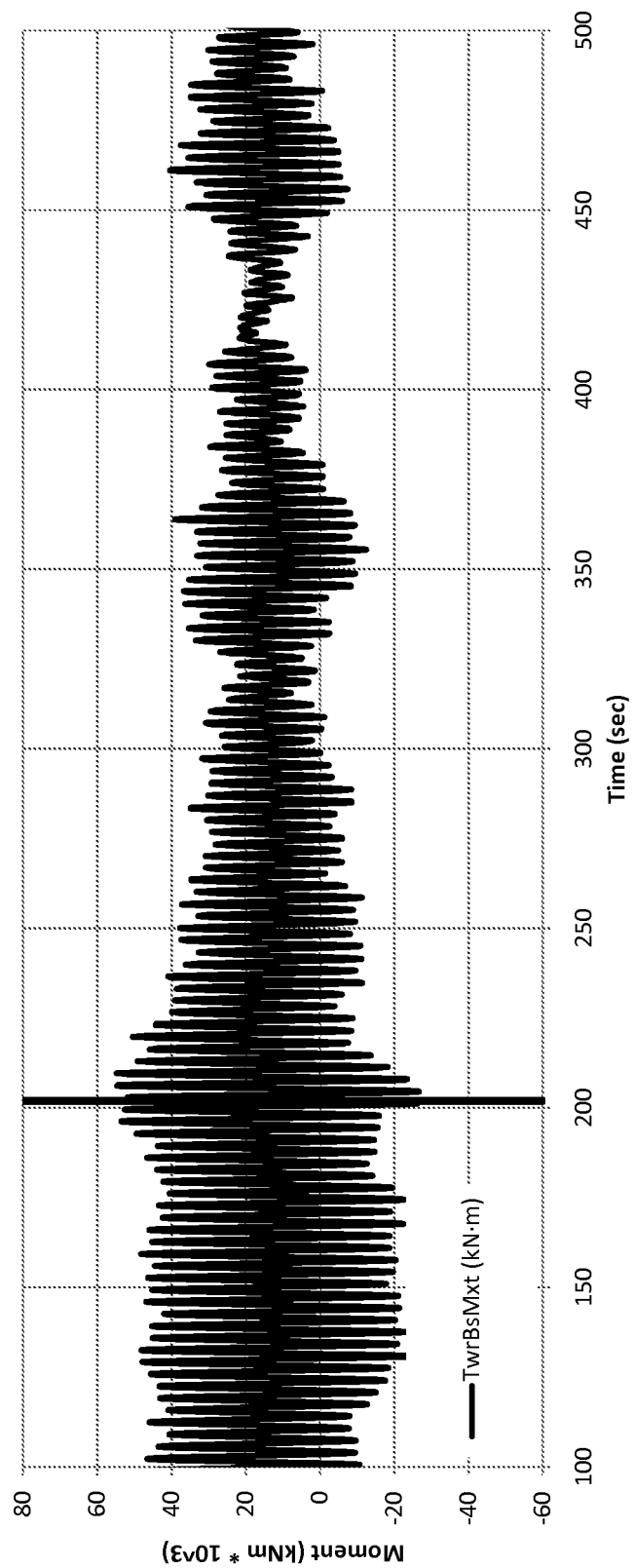
FIG. 6 is a plot of simulated bending moments in a tower of a WPU as a function of time with the system operating according to an embodiment of the invention beginning at time 200 seconds, wherein the turbine blades of the WPU are oriented approximately as illustrated in FIG. 3.

The effect of this "stick-slip" behavior in terms of reduced bending moment at the base of tower 104 is illustrated in FIG. 6. The exemplary simulation results depicted in FIG. 6 show that the bending moment is reduced when the methods of the present disclosure are applied to a parked WPU 100 when compared to the bending moments shown in FIG. 2 in which the methods of the present disclosure were not applied. As is clear when comparing these two figures, the maximum simulated bending moment is reduced by a factor of between 2 and 3 times when the methods of the present disclosure are applied.

Figure 7:
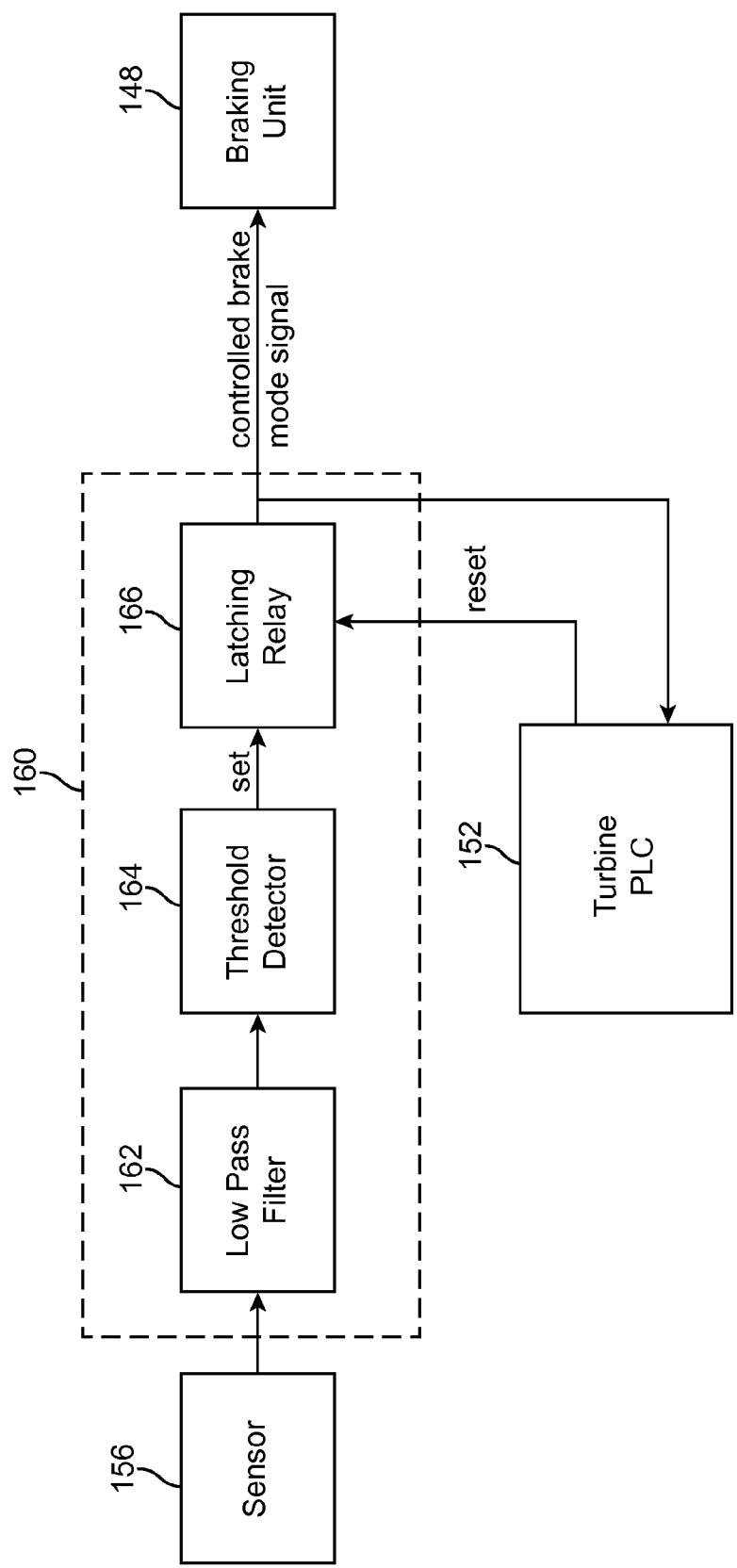
FIG. 7 is a block diagram of an analog logic circuit according to an alternative embodiment of the invention.

As mentioned above, the control logic in embodiments of the present invention may be executed in analog logic circuits as well as digital logic circuits, for example implemented in a programmable logic controller as previously described. One example of a suitable analog implementation of a logic circuit 160 is shown in FIG. 7. In this example, sensor 156 is a vibration sensor, which communicates with threshold detector 164 through low pass filter 162. When the vibration threshold is met, the signal is latched (held) by latching relay 166. When so latched, latching relay 166 signals braking system 148 to apply the reduced torque brake mode depending on the current operation state of the turbine as described above in connection with FIG. 4. As also shown in FIG. 7, in one implementation, processor 152, in this case a conventional wind power programmable logic controller, may be programmed and communicate with latching relay 166 and braking unit 148 to reset logic circuit 160 when the conditions leading to a reduced torque brake mode application are alleviated. To add a further safety feature, logic circuit 160 may be powered by an uninterruptable power supply (not shown). Specific details of low pass filter 162, threshold detector 164 and latching relay 166 are conventional and may be designed in any number of ways by persons of ordinary skill in the art based on the teachings contained herein.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for reducing dynamic loading in a wind power unit in a parked or idled condition, the wind power unit including a turbine, a turbine axle having a longitudinal axis, and a wind power unit brake system including at least one turbine brake, the system comprising:
    a sensor adapted to be positioned with the wind power unit and configured to sense at least one parameter indicative of dynamic loading in the wind power unit and produce a dynamic loading signal representative thereof; and
    a logic circuit in communication with said sensor to receive said dynamic loading signal, said logic circuit being configured to generate a braking signal in response to the dynamic loading signal indicating a level of dynamic loading exceeding a selected value;
    wherein the brake system is configured to receive said braking signal and, when said wind power unit is in either a parked condition with the brake applied or in an idled condition with the brake off, execute a reduced torque brake mode in response to said braking signal to reduce the dynamic loading of the wind power unit by permitting intermittent slip of the brake system.

2. A system according to claim 1, wherein the logic circuit comprises a threshold detector communicating with a latching relay.

3. A system according to claim 2, wherein the logic circuit further comprises a low pass filter receiving the signal from the sensor and communicating with the threshold detector.

4. A system according to claim 1, wherein the wind power unit further includes a processor, and the logic circuit comprises a program configured to be executed by the processor comprising steps of:
    determining a level of dynamic loading indicated by said dynamic loading signal;
    comparing the level of dynamic loading to said selected value; and
    outputting said braking signal in response to the dynamic loading exceeding said selected value.

5. A system according to claim 4, wherein the braking signal includes instructions for execution of a controlled application and release of the at least one turbine brake by the brake system.

6. A system according to claim 1, wherein said sensor is configured to sense dynamic loading including at least a component of motion perpendicular to the longitudinal axis of the turbine axle.

7. A system according to claim 1, wherein said sensor is an accelerometer.

8. A system according to claim 1, wherein said sensor is a displacement sensor.

9. A system according to claim 8, wherein said at least one parameter includes oscillation frequency.

10. A system according to claim 1, wherein said sensor is a vibration sensor.

11. A system according to claim 1, wherein said reduced torque brake mode comprises a controlled application and release of the brake system.

12. A system according to claim 1, wherein said reduced torque brake mode comprises application of partial braking torque.

13. A system according to claim 1, wherein said reduced torque brake mode comprises adjustment of a brake pad position within the braking system.

14. A system for reducing dynamic loading in a wind power unit in a parked or idled condition, the wind power unit being mounted on a tower and including a turbine, a turbine axle having a longitudinal axis, and a wind power unit brake system including at least one turbine brake, the system comprising:
    a sensor comprising a strain sensor on the tower and configured to sense strain in the tower as indicative of dynamic loading in the wind power unit and produce a dynamic loading signal representative thereof; and
    a logic circuit in communication with said sensor to receive said dynamic loading signal, said logic circuit being configured to generate a braking signal in response to the dynamic loading signal indicating a level of dynamic loading exceeding a selected value;
    wherein the brake system is configured to receive said braking signal and, when said wind power unit is in either a parked condition with the brake applied or in an idled condition with the brake off, execute a reduced torque brake mode in response to said braking signal to reduce the dynamic loading of the wind power unit by permitting intermittent slip of the brake system.

15. A method of reducing dynamic loading in a parked wind power unit, the wind power unit including a turbine on a turbine axle and a brake system, the method comprising:
    sensing a parameter indicative of dynamic loading of the wind power unit when said unit is in a parked condition with the brake applied;
    determining if the sensed parameter is at least at a selected value; and
    instructing the brake system, when said sensed parameter is at least at the selected value, to execute a reduced torque brake mode to reduce the dynamic loading of the tower.

16. A method according to claim 15, wherein said sensing includes sensing dynamic loading including a component of movement perpendicular to the turbine axle.

17. A method according to claim 15, further comprising sensing a parameter indicative of dynamic loading of the wind power unit when said unit is in an idled condition, and determining if the turbine is rotating freely before instructing the brake system to execute a full brake operation followed by the reduced torque brake mode.

18. A method according to claim 15, wherein said reduced torque brake mode comprises execution of a controlled brake and brake-release sequence by the brake system.

19. A method according to claim 18, wherein the controlled brake and bake-release sequence comprises application and release of the brake system.

20. A method according to claim 15, wherein the reduced torque brake mode comprises applying the brake system at partial braking torque.

21. A method according to claim 15, wherein the reduced torque brake mode comprises adjusting of a brake pad position within the braking system.

22. A method according to claim 15, wherein the parameter is displacement.

23. A method according to claim 15, wherein the parameter is vibration frequency.

24. A method according to claim 15, wherein the parameter is acceleration.

25. A method according to claim 15, wherein the wind power unit is mounted on a tower and the parameter is strain measured in a tower structure.

26. A system for reducing dynamic loading in a wind power unit in a parked condition, the wind power unit including a turbine, a turbine axle having a longitudinal axis, and a wind power unit brake system including at least one turbine brake, the system comprising:
- a sensor adapted to be positioned with the wind power unit and configured to sense at least one parameter indicative of dynamic loading in the wind power unit when said unit is parked with the brake system applied and produce a signal representative thereof;
- means, communicating with said sensor to receive said dynamic loading signal, for generating a braking signal in response to the level of dynamic loading exceeding a selected value and outputting the braking signal to the braking system, wherein the braking signal includes instructions for execution of a reduced torque brake mode to reduce the dynamic loading of the wind power unit by permitting intermittent slip of the parked turbine.

27. A system for reducing dynamic loading in a wind power unit in a parked or idled condition, the wind power unit including a turbine, a turbine axle having a longitudinal axis, and a wind power unit brake system including at least one turbine brake, the system comprising:
- a sensor adapted to be positioned with the wind power unit and configured to sense at least one parameter indicative of dynamic loading in the wind power unit and produce a signal representative thereof;
- a processor, communicating with said sensor to receive said dynamic loading signal, for generating a braking signal in response to the level of dynamic loading, said processor executing program instructions comprising
- determining whether the dynamic loading exceeds a selected value;
- determining a state of the turbine brake system as currently on or currently off;
- instructing the braking system to change the braking torque from full to reduced braking torque if the brake is currently on; and
- instructing the braking system to apply reduced braking torque if the brake is currently off.

28. A system according to claim 26, wherein means for generating a braking signal comprises a threshold detector communicating with a latching relay.

29. A system according to claim 28, wherein said means for generating a braking signal further comprises a low pass filter receiving the signal from the sensor and communicating with the threshold detector.

30. A system for reducing dynamic loading in a wind power unit in a parked or idled condition, the wind power unit including a turbine, and a turbine axle having a longitudinal axis, the system comprising:
- a sensor adapted to be positioned with the wind power unit and configured to sense at least one parameter indicative of dynamic loading in the wind power unit and produce a signal representative thereof, the dynamic loading including at least a component of motion perpendicular to the longitudinal axis of the turbine axle;
- a processor in communication with said sensor to receive said representative signal, said processor being configured and programmed to determine a level of dynamic loading indicated by the sensed parameter and compare said level to at least one selected value, said processor being further programmed to generate a braking instruction in response to the level of dynamic loading exceeding a selected valve; and
- a wind power unit brake system including at least one turbine brake, the system configured to receive the braking instruction from said processor, wherein said braking instruction includes a controlled braking and brake-release command for the brake, the controlled braking and brake-release command causing execution by said brake system of a reduced torque brake mode to reduce the dynamic loading of the wind power unit by permitting intermittent slip of the parked turbine.

* * * * *